United States Patent
Yang et al.

(10) Patent No.: US 9,619,074 B2
(45) Date of Patent: Apr. 11, 2017

(54) CONVERSION METHOD, DEVICE, AND EQUIPMENT FOR KEY OPERATIONS ON A NON-TOUCH SCREEN TERMINAL UNIT

(71) Applicant: SUZHOU SNAIL TECHNOLOGY DIGITAL CO., LTD, Suzhou (CN)

(72) Inventors: Kezun Yang, Shenzhen (CN); Lei Lei, Shenzhen (CN); Handong Feng, Shenzhen (CN); Hongmei Deng, Shenzhen (CN); Pengfei Deng, Shenzhen (CN)

(73) Assignee: SUZHOU SNAIL TECHNOLOGY DIGITAL CO., LTD. (CN)

( * ) Notice: Subject to any disclaimer, the term of this patent is extended or adjusted under 35 U.S.C. 154(b) by 197 days.

(21) Appl. No.: 14/333,325

(22) Filed: Jul. 16, 2014

(65) Prior Publication Data
US 2016/0018937 A1  Jan. 21, 2016

(51) Int. Cl.
*G06F 3/041* (2006.01)
*G06F 3/023* (2006.01)

(52) U.S. Cl.
CPC ............ *G06F 3/0416* (2013.01); *G06F 3/023* (2013.01)

(58) Field of Classification Search
CPC .................................................... G06F 3/0416
USPC .......................................................... 345/173
See application file for complete search history.

(56) References Cited

U.S. PATENT DOCUMENTS

| | | | | |
|---|---|---|---|---|
| 2002/0190946 A1* | 12/2002 | Metzger | ............. | G06F 3/04892 345/156 |
| 2004/0158817 A1* | 8/2004 | Okachi | ..................... | G06F 8/65 717/122 |
| 2014/0267029 A1* | 9/2014 | Govil | ................. | G06K 9/00355 345/157 |
| 2015/0058776 A1* | 2/2015 | Liu | ..................... | G06F 3/04842 715/771 |

\* cited by examiner

*Primary Examiner* — Jason Olson
(74) *Attorney, Agent, or Firm* — Hayes Soloway P.C.

(57) ABSTRACT

Provided is a conversion method for key operations on a non-touch screen terminal unit, involving the steps of: detecting a click action on a target key on the terminal unit, and acquiring the ID information of the target key; searching position information corresponding to the ID information in a preset profile according to the ID information; and, generating a touch screen event at the position indicated by the position information on the display screen of the terminal unit. With the present method, application programs developed for touch screens can run on non-touch screen terminal units compatibly, and thereby the compatibility of the terminal units is improved.

9 Claims, 3 Drawing Sheets

CONVERSION METHOD, DEVICE, AND EQUIPMENT FOR KEY OPERATIONS ON A NON-TOUCH SCREEN TERMINAL UNIT

FIELD OF THE INVENTION

The present invention relates to the field of electronics, in particular to conversion method, device, and equipment for key operations on a non-touch screen terminal unit.

BACKGROUND OF THE INVENTION

Through touch screen technology, the user can operate a terminal unit simply by touching the symbols or text on a display screen with his fingers; thus, the man machine interaction is more straight-forward. As multimedia technology develops, touch screens are more widely used on various terminal units, and software developers have developed many application programs for touch screen terminal units, such as game programs. However, these application programs for touch screens can't operate in non-touch screen terminal units. As non-touch screen terminal units will be washed out gradually, software developers are unwilling to spend time and efforts to develop application programs suitable for non-touch screen terminal units. Consequently, application programs compatible to non-touch screen devices become less and less. It is a hot area of research to run touch-based application programs on non-touch screen terminal units at minimum cost.

SUMMARY OF THE INVENTION

The technical problem to be solved by the embodiments of the present invention is to provide a conversion method, a conversion device, and a conversion equipment for key operations on a non-touch screen terminal unit, which can solve the problem that the application programs developed for touch screens are incompatible when they are ported to non-touch screen terminal units in the prior art.

To solve the technical problem described above, a conversion method for key operations on a non-touch screen terminal unit is provided in the embodiments of the present invention. The conversion method comprises:

detecting a click action on a target key on the terminal unit, and acquiring the ID information of the target key;

searching the position information corresponding to the ID information in a preset profile, according to the ID information;

generating a touch screen event at the position indicated by the position information on the display screen of the terminal unit.

Accordingly, a conversion device for key operations on a non-touch screen terminal unit is provided in the embodiment of the present invention. The conversion device comprises:

a detecting module, designed to detect a click action on a target key on the terminal unit and acquire the ID information of the target key;

a searching module, designed to search the position information corresponding to the ID information in a preset profile according to the ID information;

a generating module, designed to generate a touch screen event at the position indicated by the position information on the display screen of the terminal unit.

The present invention further provides a kind of electronic equipment, which comprises the conversion device described above.

The embodiments of the present invention have the following beneficial effects:

In the embodiments of the present invention, the ID information of a target key where a click action happens on a terminal unit is detected, the corresponding position information is searched in a profile according to the ID information, and the click action on the target key is converted into a touch screen event at the specified position on the display screen of the terminal unit; thus, a phenomenon that application programs developed for touch screens are incompatible when they are ported to non-touch screen terminal units in the prior art is avoided, and the universality of non-touch screen terminal units is effectively improved.

DESCRIPTION OF THE DRAWINGS

For better understanding of the technical scheme in the embodiments of the present invention or in the prior art, hereunder the drawings used in the description of the embodiments or the prior art will be introduced briefly. Apparently, the drawings describe below only illustrate some embodiments of the present invention. Those skilled in the art can obtain drawings of other embodiments on the basis of these drawings without creative labor.

EMBODIMENTS

Hereunder the technical scheme of the present invention will be described clearly and completely in embodiments with reference to the accompanying drawings. Apparently, the described embodiments are only some embodiment of the present invention, but not all embodiments of the present invention. Those skilled in the art can obtain other embodiments without creative labor, on the basis of the embodiments provided here; however, all these embodiments shall be deemed as falling into the protection scope of the present invention.

Figure 1:
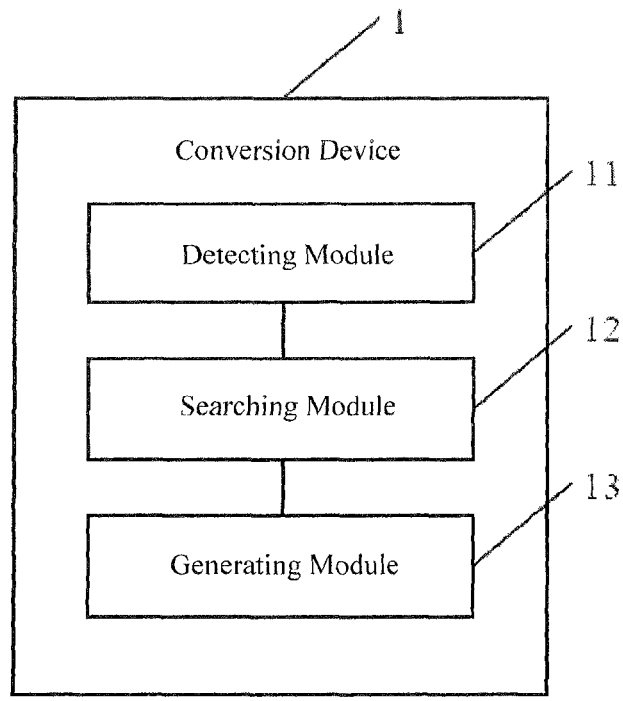
FIG. 1 is a schematic diagram of a structure of the conversion device for key operations on a non-touch screen terminal unit according to an embodiment of the present invention.

Please see FIG. 1, which is a schematic diagram of a structure of the conversion device for key operations on a non-touch screen terminal unit (hereafter simply referred to as "conversion device") according to an embodiment of the present invention. The conversion device 1 comprises:

a detecting module 11, designed to detect a click action on a target key on the terminal unit and acquire the ID information of the target key;

Specifically, the terminal unit interacts with the user by means of a non-touch screen; when the detecting module 11 detects that a target key on the terminal unit is pressed, it will ascertain the ID information of the target key according to the position of level change on the terminal unit. For example, for a matrix keyboard, the detecting module 11 ascertains the position of a key where a click action happens in the keyboard by detecting the level change in the row lines and column lines and thereby ascertains the ED information of the key.

a searching module 12, designed to search position information corresponding to the ID information in a preset profile according to the ID information;

Specifically, a mapping record between ID information of target key and a position information is stored in a profile. For example, key A is associated with coordinates (115, 120). At least one set of mapping records are stored in the profile. The searching module 12 searches that the position information associated with key A is (115, 120) according to the ID information of the key A, wherein, the user can update, delete, and edit the mapping records in the profile as required.

a generating module 13, designed to generate a touch screen event at the position indicated by the position information on the display screen of the terminal unit.

Specifically, the generating module 13 converts a click action on a target key into a touch screen event at the position indicated by the position information on the display screen of the terminal unit. For instance, in the example described above, a click action on key A is converted into a touch screen event at coordinates (115, 120) on the display screen of the terminal unit, and the touch screen event can be a click event.

In this embodiment of the present invention, the ID information of a target key where a click action happens on a terminal unit is detected, the corresponding position information is searched in a profile according to the ID information, and the click action on the target key is converted into a touch screen event at the specified position on the display screen of the terminal unit; thus, a phenomenon that the application programs developed for touch screens are incompatible when they are ported to non-touch screen terminal units in the prior art is avoided, and the universality of non-touch screen terminal units is effectively improved.

Figure 2:
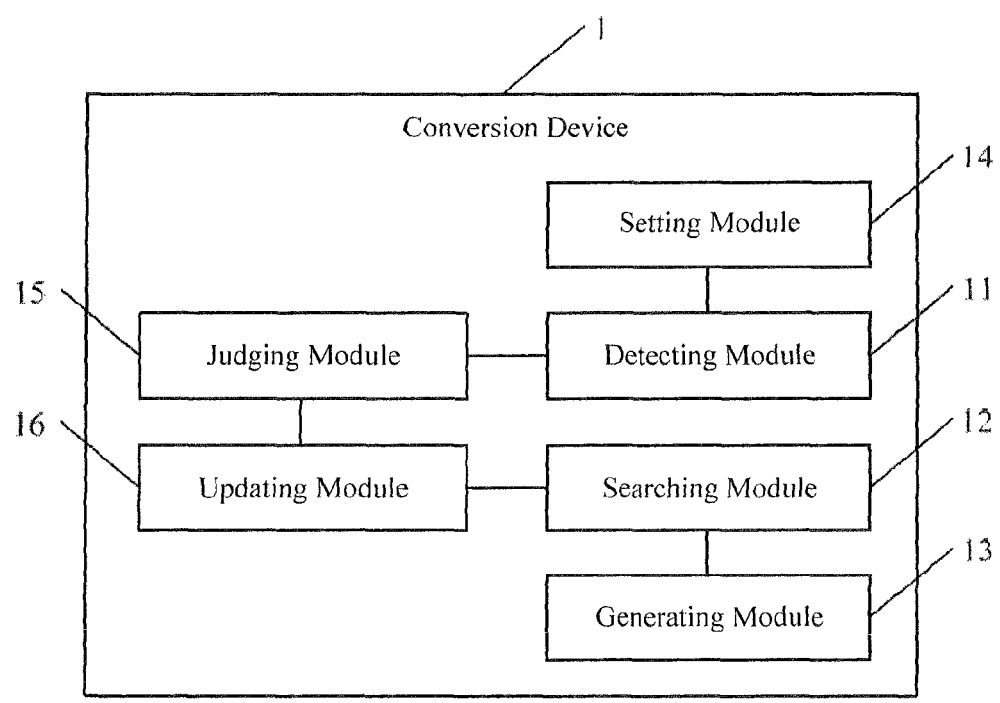
FIG. 2 is a schematic diagram of another structure of the conversion device for key operations on a non-touch screen terminal unit according to an embodiment of the present invention.
Figure 3:
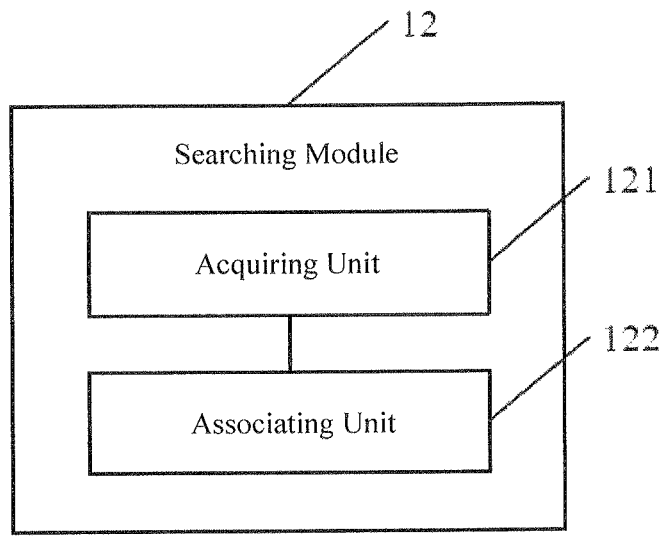
FIG. 3 is a schematic diagram of structure of the searching module shown in FIG. 2.

Please see FIG. 2 and FIG. 3, which show schematic diagrams of another structure of the conversion device for key operations on a non-touch screen terminal unit according to an embodiment of the present invention. In addition to the detecting module 11, searching module 12, and generating module 13, the conversion device further comprises:

a setting module 14, designed to set the mapping relation between ID information and position information of target keys, and saving the mapping relation in the profile.

Specifically, the setting module 14 sets the mapping relation between ID information and position information of target keys. For example, if the ID information of a target key is key A and the position information corresponding to key A is coordinates (120, 150), the setting module 14 associates key A with coordinates (120, 150) to create a mapping relation between them, and saves the mapping relation in the profile, wherein, the profile comprises at least a set of mapping relation between ID information and position information of a key, and may further comprise the mapping relation of other keys.

a judging module 15, designed to judge whether a conversion operation for the click action on the target key is required; if a conversion operation is required, execute the step of searching position information corresponding to the ID information in the preset profile according to the ID information; otherwise execute a default control command for the click action on the target key;

Specifically, the judging module 15 can judge whether a conversion operation for the click action on the target key is required according to the user's settings; if a conversion operation is required, it will instruct the searching module 12 to act; otherwise it will execute a default control command for the click action on the target key, for example, the default control command for the click action on key A is to display a character "A" on the display screen of the terminal unit.

an updating module 16, designed to judge whether the profile is of the latest version according to the version number of the profile; if the profile is of the latest version, load the profile into the memory of the terminal unit; otherwise request for the latest version of the profile with a server through a wireless or wired network.

Specifically, if the current version number of the profile for the terminal unit is RO, the updating module 16 sends the version number RO of the profile to a server for comparison; if the version number of the profile at the terminal unit side matches the version number of the profile at the server side, it indicates that the profile doesn't have to be updated, and, in that case, the updating module 16 will load the profile into the memory of the terminal unit; if the version number of the profile at the terminal unit side doesn't match the version number of the profile at the server side, the updating module 16 will request for the latest version of profile with the server. The updating module 16 is further designed to request for a profile corresponding to the application program in the terminal unit when it detects change of the application program of the terminal unit, to ensure the profile matches the application program in the terminal unit.

Wherein, the searching module 12 comprises:

an acquiring unit 121, designed to acquire a profile corresponding to the application program for the touch screen according to the ID of the application program for touch screen installed in the terminal unit;

an associating unit 122, designed to search position information associated with the ID information in the profile according to the ID information.

In this embodiment of the present invention, the ID information of a target key where a click action happens on a terminal unit is detected, the corresponding position information is searched in a profile according to the ID information, and the click action on the target key is converted into a touch screen event at the specified position on the display screen of the terminal unit; thus, a phenomenon that the application programs developed for touch screens are incompatible when they are ported to non-touch screen terminal units in the prior art is avoided, and the universality of non-touch screen terminal units is effectively improved.

Figure 4:
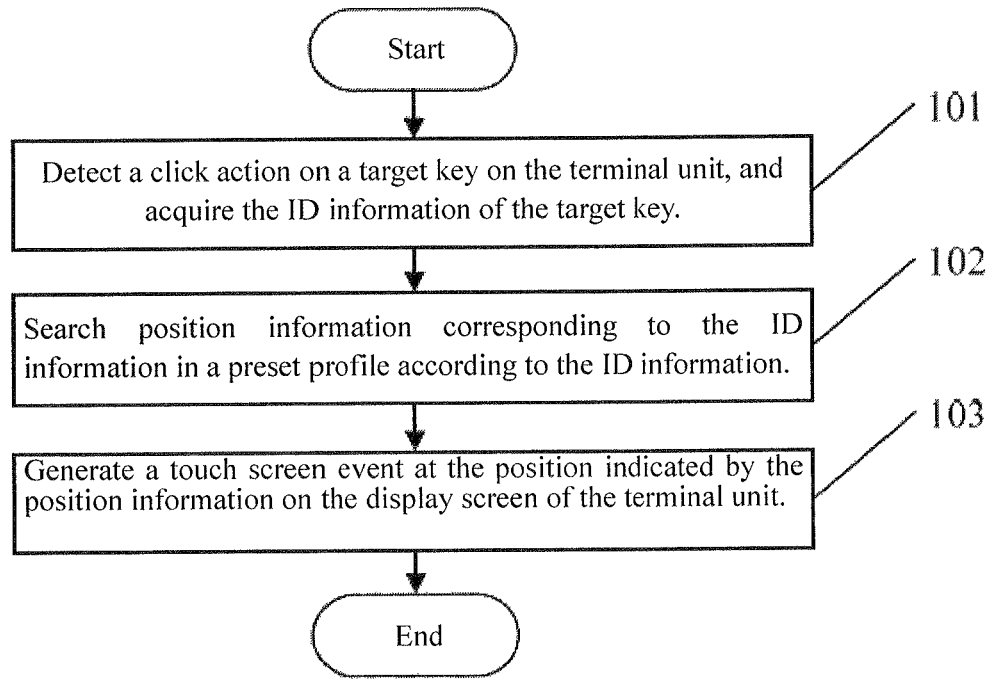
FIG. 4 is a flow chart of the conversion method for key operations on a non-touch screen terminal unit according to an embodiment of the present invention.

Please see FIG. 4, which is a flow chart of the conversion method for key operations on a non-touch screen terminal unit according to an embodiment of the present invention. The method comprises:

Step 101: detecting a click action on a target key of the terminal unit, and acquiring the ID information of the target key;

Step 102: searching position information corresponding to the ID information in a preset profile, according to the ID information;

step 103: generating a touch screen event at the position indicated by the position information on the display screen of the terminal unit.

In this embodiment of the present invention, the ID information of a target key where a click action happens on a terminal unit is detected, the corresponding position information is searched in a profile according to the ID information, and the click action on the target key is converted into a touch screen event at the specified position on the display screen of the terminal unit; thus, a phenomenon that the application programs developed for touch screens are incompatible when they are ported to non-touch screen terminal units in the prior art is avoided, and the universality of non-touch screen terminal units is effectively improved.

Figure 5:
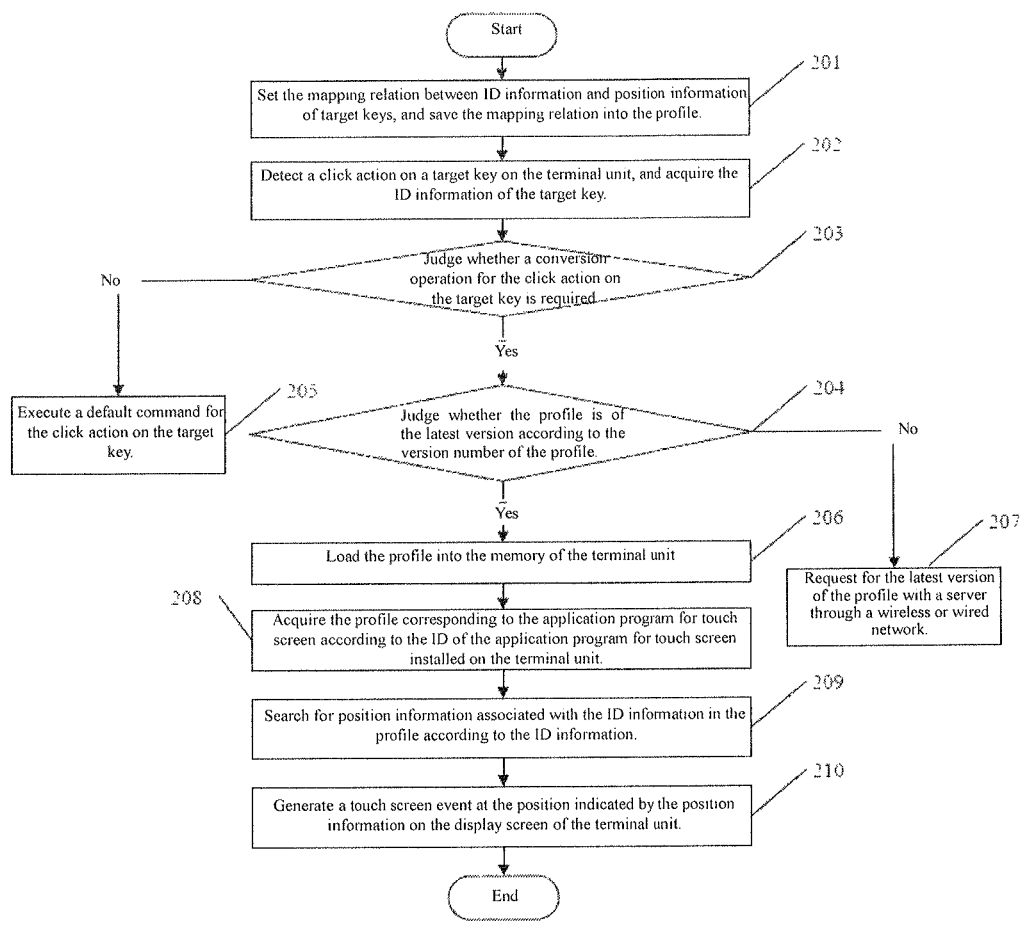
FIG. 5 is another flow chart of the conversion method for key operations on a non-touch screen terminal unit according an embodiment of the present invention.

Please see FIG. 5, which is another flow chart of the conversion method for key operations on a non-touch screen terminal unit according to an embodiment of the present invention. The method comprises:

step 201: setting the mapping relation between ID information and position information of target keys, and saving the mapping relation into the profile;

Specifically, the setting module 14 sets the mapping relation between ID information and position information of target keys. For example, if the ID information of a target key is key A and the position information corresponding to key A is coordinates (120, 150), the setting module 14 associates key A with coordinates (120, 150) to create a mapping relation between them, and saves the mapping relation into the profile, wherein, the profile comprises at least a set of mapping relation between ID information and position information of a key, and may further comprise the mapping relation of other keys.

step 202: detecting a click action on a target key of the terminal unit, and acquiring the ID information of the target key;

Specifically, the terminal unit interacts with the user by means of a non-touch screen; when the detecting module 11 detects that a target key is pressed on the terminal unit, it will ascertain the ID information of the target key according to the position of level change on the terminal unit. For example, for a matrix keyboard, the detecting module 11 ascertains the position of a key where a click action happens by detecting the level change in the row lines and column lines and thereby ascertains the ID information of the key.

step 203: judging whether a conversion operation for the click action on the target key is required;

Specifically, if a conversion operation is required, step 204 will be executed; otherwise step 205 will be executed.

step 204: judging whether the profile is of the latest version according to the version number of the profile;

step 205: executing a default control command for the click action on the target key.

step 206: loading the profile into the memory of the terminal unit.

step 207: requesting for the latest version of profile with a server through a wireless or wired network;

step 208: acquiring a profile corresponding to the application program for touch screen, according to the ID of the application program for touch screen installed in the terminal unit;

step 210: generating a touch screen event at the position indicated by the position information on the display screen of the terminal unit.

According to the embodiment of the present invention, the ID information of a target key where a click action happens on a terminal unit is detected, the corresponding position information is searched in a profile according to the ID information, and the click action on the target key is converted into a touch screen event at the specified position on the display screen of the terminal unit; thus, a phenomenon that the application programs developed for touch screens are incompatible when they are ported to non-touch screen terminal units in the prior art is avoided, and the universality of non-touch screen terminal units is effectively improved.

Those skilled in the art can understand that the process flows of the methods in the above embodiments can be completely or partly implemented by utilizing a computer program to instruct relevant hardware, the computer program can be stored in a computer readable storage medium, and the program can comprise the process flows of the embodiments of the methods described above when it is executed, wherein, the storage medium can be a magnetic disk, optical disk, Read-Only Memory (ROM), or Random Access Memory (RAM), etc.

While the present invention is described and disclosed above in some preferred embodiments, the present invention is not limited to those embodiments. Those skilled in the art can understand and achieve all or partial process flows of above embodiments and make equivalent modification according to the claims, which still fall in to the protection scope of the present invention.

The invention claimed is:

1. A conversion method for key operations on a non-touch screen terminal unit, comprising:
    detecting a click action on a target key for where the click action happens on the terminal unit, and acquiring the ID information of the target key;
    identifying at least one application program installed on the terminal unit;
    acquiring a preset profile based on an identification of the at least one application program, whereby the preset profile matches the at least one application program;
    searching position information corresponding to the ID information in the preset profile, according to the ID information;
    generating a row and column line event at the position indicated by the position information on the display screen of the terminal unit; and
    judging whether the profile is of the latest version according to the version number of the profile; if the profile is of the latest version, loading the profile into the memory of the terminal unit; otherwise requesting for the latest version of the profile with a server through a wireless or wired network.

2. The conversion method as described in claim 1, wherein, it further comprises the following step before the step of detecting a click action on a target key on the terminal unit and acquiring the ID information of the target key:
    setting the mapping relation between ID information and position information of target keys, and saving the mapping relation into the profile.

3. The conversion method as described in claim 2, wherein, it further comprises the following step before the step of searching position information corresponding to the ID information in the preset profile according to the ID information:
    judging whether a conversion operation for the click action on the target key is required; if a conversion operation is required, executing the step of searching position information corresponding to the ID information in the preset profile according to the ID information; otherwise executing a default control command for the click action on the target key.

4. The conversion method as described in claim 3, wherein, the step of searching position information corresponding to the ID information in the preset profile according to the ID information comprises
    searching for position information associated with the ID information in the profile, according to the ID information.

5. A conversion device for key operations on a non-touch screen terminal unit, characterized in that, it comprises:
  a detecting module, designed to detect a click action on a target key for where the click action happens on the terminal unit and acquire the ID information of the target key;
  a searching module, designed to search position information corresponding to the ID information in a preset profile according to the ID information, wherein the preset profile is acquired based on an identification of at least one application pro ram installed on the terminal unit, wherein the preset profile matches the at least one application program;
  a generating module, designed to generate a row and key event at the position indicated by the position information on the display screen of the terminal unit; and
  an updating module, designed to judge whether the profile is of the latest version according to the version number of the profile; if the profile is of the latest version, load the profile into the memory of the terminal unit; otherwise request for the latest version of the profile with a server through a wireless or wired network.

6. The conversion device as described in claim 5, wherein, it further comprises:
  a setting module, designed to set the mapping relation between ID information and position information of target keys, and saving the mapping relation into the profile.

7. The conversion device as described in claim 6, wherein, it further comprises:
  a judging module, designed to judge whether a conversion operation for the click action on the target key is required; if a conversion operation is required, execute the step of searching position information corresponding to the ID information in the preset profile according to the ID information; otherwise execute a default control command for the click action on the target key.

8. The conversion device as described in claim 7, wherein, the searching module comprises
  an associating unit, designed to search position information associated with the ID information in the profile according to the ID information.

9. An electronic equipment, comprising the conversion device as described in claim 5.

* * * * *